Nov. 18, 1958     J. F. DOOLEY, JR     2,860,898
TENSION ABSORBING TURNBUCKLE
Filed Oct. 2, 1956
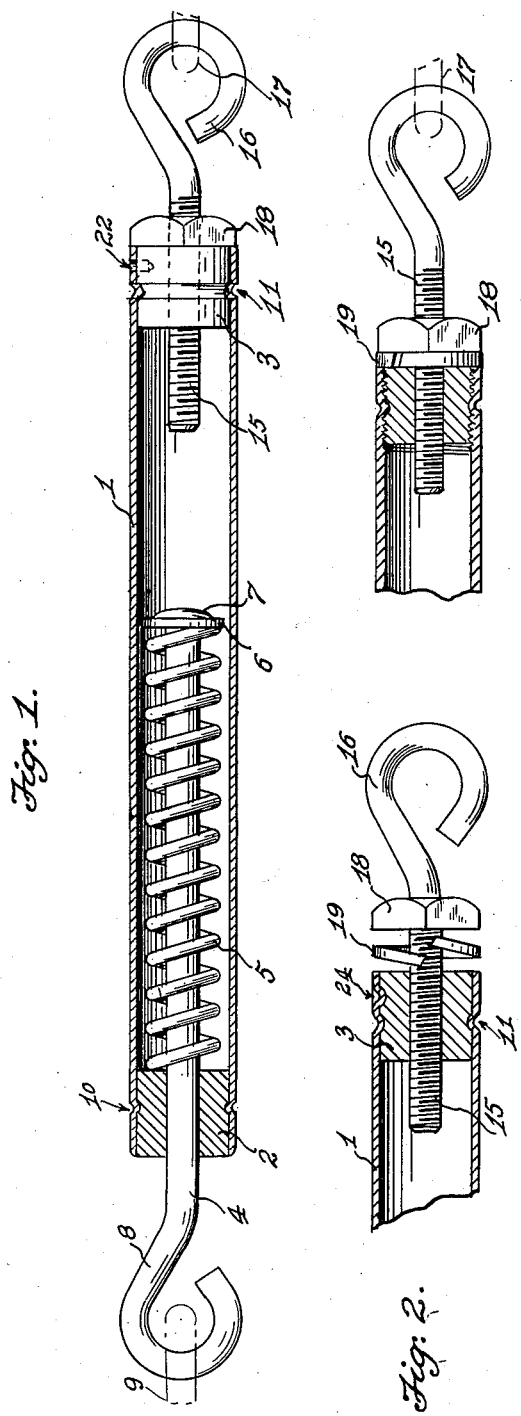
J. F. Dooley, Jr.
INVENTOR,
BY O O Martin
ATTORNEY

United States Patent Office 2,860,898
Patented Nov. 18, 1958

2,860,898

TENSION ABSORBING TURNBUCKLE

John F. Dooley, Jr., Pacoima, Calif.

Application October 2, 1956, Serial No. 613,452

1 Claim. (Cl. 287—61)

This invention relates to a device for relieving the tension on cables and guy wires which are subjected to severe vibratory shocks.

It is the object of the invention to provide a simple, adjustable, spring-controlled device capable of absorbing such shocks and so to eliminate all danger of damage to the supported cable. It is a further object of the invention to provide means for interlocking the component parts of the device so completely that no slippage or other change of self adjustment is possible. A still further object is to provide a device capable of automatic swivel adjustment to relieve twisting strains on the supported cable.

The objects and the many advantageous features of the invention are hereinafter fully described and drawings are hereto appended in which preferred forms of the invention are illustrated.

In the drawings:

Fig. 1 is a side elevational view of a device embodying the invention;

Fig. 2 shows one end of the device in a different position of adjustment;

Fig. 3 is a similar view including some modifications;

Fig. 4 is an end view of the device; and

Fig. 5 shows another modification of the device.

The device of the invention, in the form illustrated in the drawings, comprises a tubular body 1 closed at both ends by plugs 2, 3. A stem 4 is seated for axial sliding movement in the plug 2 and a compression spring 5 rides on the portion of the stem within the tube. The inner end of the stem is reduced in diameter to receive a washer 6 and the projecting end of the stem is by riveting or spinning spread to provide a head 7 which maintains the washer rigidly locked in position on the end of the stem. The outer end of the stem is bent to form a hook 8 of a size to receive the end of a guy wire or cable 9.

The plug 3 is shown internally threaded to receive a threaded rod 15 the outer end of which is similarly bent to provide an anchoring hook 16 for an extension 17 of the guy wire or other device the turnbuckle is designed to serve.

The compression spring 5 should be of a strength to resist the tension the guy wire normally is subjected to and the rod 15 is adjusted axially in the threads of the plug 3 until all slack in the wire or cable is taken up, whereupon a nut 18 of the rod is advanced tightly to lock the rod in adjusted position in the plug. This may be found sufficient securely to lock the rod in position in ordinary cases where the wire or cable is not subjected to excessive strains but it is in some cases necessary to provide additional interlocking means and I have for this purpose in Fig. 2 of the drawings shown a spring washer 19 placed between the lock nut and the end of the turnbuckle body. A spring washer of the proper size and strength, when clamped tightly in position by the nut, can be depended upon to resist any tendency on the part of the rod to rotate in the plug when suddenly subjected to severe strains.

Assembling the parts to form the turnbuckle of the invention it is merely required to place the plug 2 and spring 5 on the stem 4, whereupon the washer 6 is locked in position thereon in the manner above described. It is important to note that a circular groove 10 is cut into the cylindrical surface of the plug 2 and that the wall of the tube is, after the parts have been pushed in position within the body, crimped tightly to engage the groove thereby to lock the plug against axial displacement within the end of the tube. But the stem retains freedom of axial and rotative movements in the plug.

The nut 18 is to assemble the other end of the tube closure first advanced on the rod 15 to the end of the threads thereof and the spring washer 19 is pushed in position on the rod, whereupon the plug 3 is mounted on the threads of the rod. The assembled parts may now be pushed into the tube until the outer end of the plug registers with the end of the tube. The plug 3 is, like the plug 2, intermediate its ends shown grooved at 11 and the wall of the tube is similarly crimped to lock the plug against axial displacement within the tube. When thereupon the nut 18 is operated to press the spring washer against the end of the tube, it is found that the plug is locked rigidly in position.

This assembling may be rendered simpler by threading the contacting surfaces of the plug and tube, as indicated at 20 in Fig. 3. The plug may then easily be advanced into the correct position within the tube, as required for the crimping operation. The plug is for this purpose at 21 shown slotted or otherwise shaped to receive a screwdriver or other turning tool. When thereupon the nut is moved to press the spring washer against the end of the tube it will not be possible for the rod to shift its position within the plug. To make even more certain that no displacement of the plug can take place it is possible, after the plug has been locked in position as above described, to drill a seat through the tube wall into the plug and to drive a small pin 22 into this seat, as indicated, or it may be found advantageous in cases where the strains the plugs are subjected to are excessive, upon completion of the crimping operation to solder the plugs in position or to swage the rims of the tube over the ends of the plugs, substantially as indicated at 23 in Fig. 5. When this is done and particularly when the plug is seated in threads of the tube, as indicated in Figs. 3 and 5, it is found that displacement of the plug under the severest operating conditions is rendered impossible. The opposite end of the tube may, of course, be similarly provided with such additional interlocking means.

It may be found preferable, instead of drilling for the pin 22 and then driving the pin in position merely to stake the wall of the tube into an indentation of the surface of the plug, substantially as indicated at 24 in Fig. 2. This, also, will maintain the plug unturned under any condition.

It is seen from the foregoing description that I have provided means for locking the plugs rigidly against axial displacement within the tube. Also that means are provided for rigidly clamping both the plug and the threaded rod in position against rotative slipping movement. And it is important to note that the threaded rod may readily be released for adjustment to take up slack in the cable at any time such adjustment may be required and again clamped rigidly in position.

I claim:

A tension relieving turnbuckle for a cable comprising, a tube, plugs seated in the ends of the tube, a stem seated for axial movement in one of the plugs to receive one end of the cable, a compression spring on the stem within the tube, a head on the inner end of the stem maintaining the spring in position thereon, a threaded rod seated in threads of the other plug to receive the other end of the cable, each plug having a circular groove sunk into the cylindrical surface thereof, the wall of the tube being crimped tightly to seat in the grooves of the plugs, a recess cut through the wall of the tube into the threaded rod supporting plug, a pin driven into the recess tightly to seat in the plug to lock the plug against rotative movement in the tube, a nut on the threads of the rod for engagement with the end of the tube to lock the rod and plug against rotative movement within the tube, and a spring washer seated on the threads of the rod between the nut and the end of the tube.

References Cited in the file of this patent

UNITED STATES PATENTS

| | | |
|---|---|---|
| 346,771 | Phillips | Aug. 3, 1886 |
| 557,037 | Toquet | Mar. 24, 1896 |
| 804,696 | Winterhoff | Nov. 14, 1905 |
| 1,374,963 | Stevenson | Apr. 19, 1921 |